United States Patent [19]
Weng et al.

[11] Patent Number: 5,560,004
[45] Date of Patent: Sep. 24, 1996

[54] METHOD FOR PROCESSING PROGRAM MODULES BEING TRANSFERRED AND STORED IN NETWORK MANAGEMENT CENTRAL BASED ON INFORMATIONAL CONTENTS IN UPDATING MESSAGE FROM CONNECTED DATA PROCESSING SYSTEM

[75] Inventors: Wolfgang Weng, Munich; Friedrich Woerndle, Ostermuenchen, both of Germany

[73] Assignee: Siemens Aktiengesellschaft, Munich, Germany

[21] Appl. No.: 185,510

[22] Filed: Jan. 24, 1994

[30] Foreign Application Priority Data

Feb. 26, 1993 [DE] Germany .......................... 43 06 030.7

[51] Int. Cl.[6] .................................................. G06F 13/00
[52] U.S. Cl. .................... 395/600; 395/200.09; 395/650; 395/700; 364/222.2; 364/230.3; 364/230.4; 364/DIG. 1
[58] Field of Search ................................. 395/600, 650, 395/800, 200.09, 700; 370/58.2

[56] References Cited

U.S. PATENT DOCUMENTS

| | | | |
|---|---|---|---|
| 5,018,097 | 5/1991 | Kuhlmann et al. | 395/700 |
| 5,047,923 | 9/1991 | Elstner et al. | 395/600 |
| 5,109,484 | 4/1992 | Hughes et al. | 395/200.1 |
| 5,390,335 | 2/1995 | Stephan et al. | 395/800 |
| 5,432,931 | 7/1995 | Woess et al. | 395/650 |
| 5,450,569 | 9/1995 | Schallier | 395/650 |

FOREIGN PATENT DOCUMENTS 0303869  2/1989  European Pat. Off. .

OTHER PUBLICATIONS

Computer Design, vol. 24, No. 4, Littleton, Massachusetts USA, "Network Management Simplified Through Combined Functions", by Daniel M. Profant, (Apr. 1985), pp. 149–154.

Siemens Telcom Report, vol. 12, No. 3, Berlin & Munich, "Protokollvereinbarungen für rechnergestütztes Netzmanagement", Uwe Timmermann, (May 1989), pp. 80–82.

Electronics and Communications in Japan, Part 1: Communications, vol. 74, No. 4, "Hierarchical Service Control Scheme for Intelligent Network Services", Y. Kondo et al, (Apr. 1991), pp. 1–11.

IEEE Global Telecommunications Conference & Exhibition, vol. 2, Dallas Texas, "Process Management and Control Software for Distributed Telecommunications Switching Systems", T. Murakami et al, (Nov. 27, 1989), pp. 454–459.

AT&T Technology, vol. 6, No. 2, New York US, "Tools For Better Network Management", H. W. Pribble et al, (1991), pp. 30–37.

"Carrier Sense Multiple Access with Collision Detection (CSMA/CD) Access Method and Physical Layer Specifications", An American National Standard, IEEE Standards for Local Area Networks, Pus.by the Inst.of Elec.& Elec.Eng-.Inc.Siemens.

Primary Examiner—Thomas C. Lee
Assistant Examiner—Moustafa Mohamed Meky
Attorney, Agent, or Firm—Hill, Steadman & Simpson

[57] ABSTRACT

Administration order program modules (APM) are transferred into a job file memory (AS) of a network management central (NMZ) that can be connected to the communication systems (AS) via a local network (LAN). The job information and communication system information (asi, ksi) as well as a type of job information (ati) contained in an allocated updating message (ai) are entered into a job library file (ABR) provided in the network management central (NMZ), i.e. are logged. The transferring or logging into the job library file (ABR) is indicated to a job management routine (AVR). The respective administration order program module (APM) is communicated to the appertaining communication systems (KS) the job management routine (AVR) and is processed in these communication systems (KS).

19 Claims, 2 Drawing Sheets

1

METHOD FOR PROCESSING PROGRAM MODULES BEING TRANSFERRED AND STORED IN NETWORK MANAGEMENT CENTRAL BASED ON INFORMATIONAL CONTENTS IN UPDATING MESSAGE FROM CONNECTED DATA PROCESSING SYSTEM

BACKGROUND OF THE INVENTION

The administration or management of the resources of a communication system, particularly switching systems, is effected by administrative instructions or by administration and maintenance instructions, respectively. The administration of communication systems particularly comprises the management of the subscriber terminals and other terminals of a communication system, i.e. the establishment, modification and canceling of subscriber terminals and, in particular, of internal telephone numbers or subscriber telephone numbers, is essentially implemented by the administration of communication systems. The administrative or administration and maintenance instructions can be combined to form command batches. Every command batch advantageously has an operator task (for example, establishing subscribers) allocated to it, whereby this command batch is defined as an operator-task-related administration program module.

The operator-task-related administration program modules are advantageously produced in a data processing system or in a personal computer (PC) and are communicated to the respective communication system via the operational terminal or via the control terminal, respectively. Network management centrals are established for the administration of a plurality of communication systems in a communication network, whereby the administration and maintenance instructions are communicated to the operational or control terminals of the communication systems from the network management centrals via the existing communication network. An administration routine which coordinates the processing usually assumes the processing of the administration program modules. The operator-task-oriented administration program modules for the individual communication systems are also advantageously formed in a data processing system or in a PC, respectively.

SUMMARY OF THE INVENTION

It is an object of the present invention to, provide a method for transferring and logging operator-task-oriented administration program modules from a data processing system or from a personal computer to a network management central.

In general terms the method of the present invention is for transferring and logging operator-task-oriented administration order program modules formed by administration and maintenance instructions from a data processing system via a local network to a network management central that can be connected to communications systems via a communication network. A job management routine that coordinates the processing of the administration order program modules is provided in the network management central. The administration order program modules are transferred from the data processing system into a job file memory of the network management central. The job information and communication system information and a type of job information contained in an allocated updating message are entered into a job library file provided in the network management central. The respective entry into the job library file is indicated to the job management routine by the respective updating message. Dependent on the informational contents of the type of job information as well as job and communication system information contained in the updating message, the stored administration order program modules are processed using the job management routine. Processing status information is entered into the job library file individually associated to administration order program.

An important aspect of the method of the present invention is that every administration program module formed in the data processing system or in a personal computer is communicated from the data processing system via a local network to a job file memory in a network management central as an administration order module and is stored therein. Simultaneously with the transferring of the administration order module, an updating message is communicated that, first, indicates the transfer of an administration order program module of the administration and maintenance routine, (i.e., a job management routine), and, second, contains information about the transferred administration order program module that is entered in a job library file implemented in the network management central. Dependent on the informational contents of the entered information, the allocated, stored administration order program module is processed using the job management routine. That is, this is communicated in controlled fashion to the respective communication system. This module then is processed and the returned processing results are stored for the purpose of being called up by the data processing system or by the personal computer. Processing status information is formed during the processing of the administration order program module and is entered into the job library file individually associated to the order program module.

According to an advantageous development of the method of the present invention, the type of entered job processing is modified by the type of job information, the job information and the communication system information, contained in a further transferred updating message by entering the currently transferred type of job information into the job library file or the entered processing status information, are read and are transferred to the data processing system. The affected administration order program module is defined by the job and communication system information. No administrative program module is transferred with this updating message. Rather, the type of job processing of an entered administration order program module that is already transferred is modified, or processing status information formed during the processing is called in by the data processing system.

The type of job processing is respectively specified by the type of job information. The type of job information is represented by data entry information, by start information, by erase information, by status information, or by time information. The job information is especially advantageously represented by an operator-task-related information. The communication system to which the entered administration order program module is allocated is defined by the communication system information.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
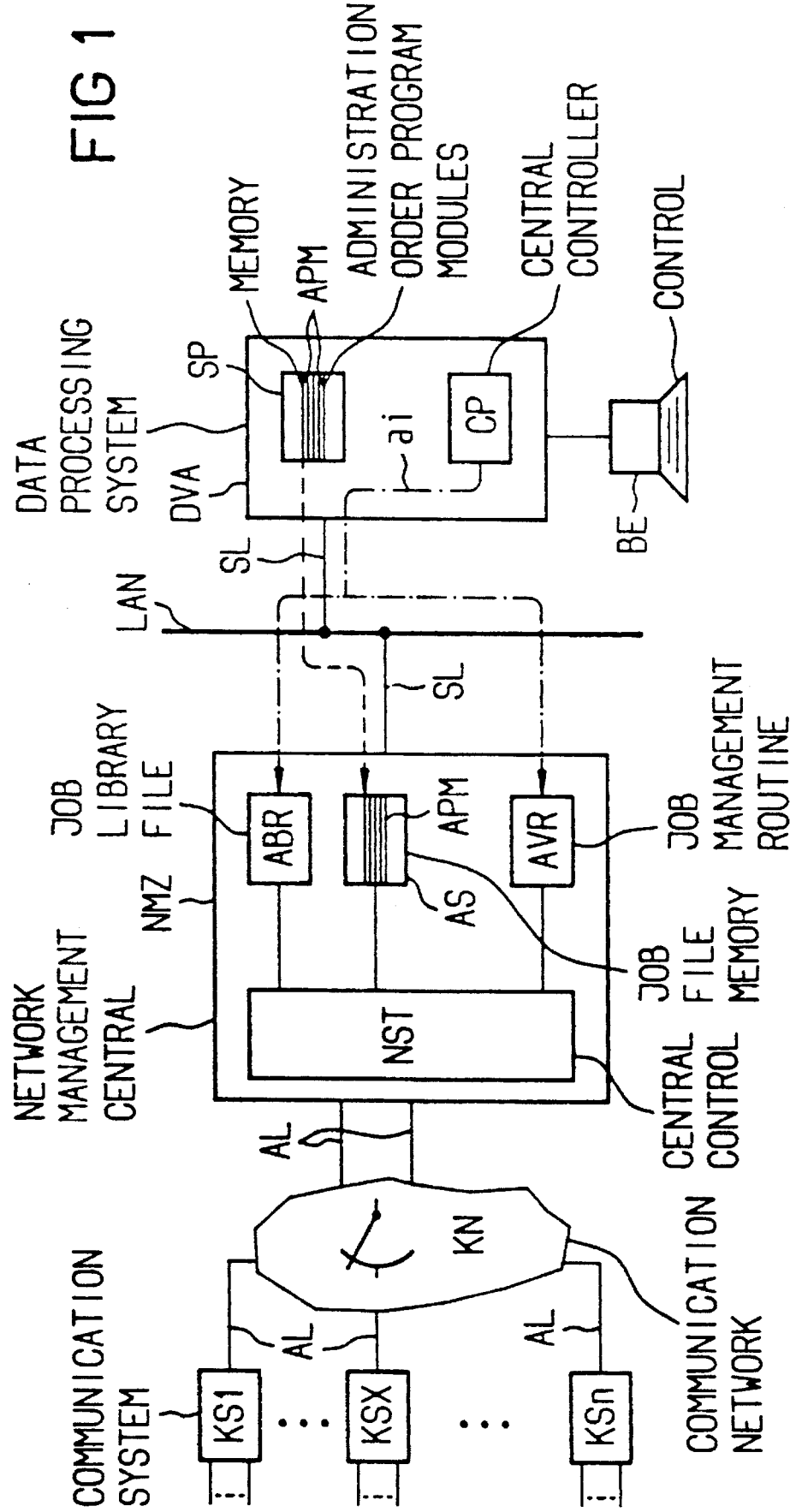
FIG. 1 is a block diagram of a network management central and a data processing system for the method of the present invention.

FIG. 1 shows a network management central NMZ that can be connected to communication systems KS1... KSn via central office lines AL and via a communication network KN. For example, the communication systems KS1... KSn represent private branch exchanges that are each respectively connected to the communication network (for example, the public telephone network) via a central office line AL.

The network management central NMZ is also connected via a spur line SL to a local network LAN to which a data processing system DVA is connected via a further spur line SL. The local network LAN, for example, is realized by a local network according to the IEEE Standard 802.3 "Carrier Sense Multiple Access with Collision Detection". A network management central NMZ has a central control means NST and a job file memory AS. A job management routine AVR that is realized in program-oriented terms and a job library file ABR are realized in the network management central NMZ using the central controller NST.

The data processing system DVA has a memory SP wherein administration order program modules APM are stored. Let it be assumed for the exemplary embodiment that the administration order program modules APM are formed by a central controller CP in the data processing system DVA and by a control means BE (realized, for example, as a video screen means) and are stored in the memory SP. The individual administration order program modules APM each comprise an operator task such as, for example, establish subscriber, modify, etc. With the assistance of the central controller CP, the administration order program modules APM are communicated via the local network LAN to the job file memory AS. An updating message ai is thereby placed preceding the administration order program module APM, the administration order program module APM being transferred and being logged in the network management central NMZ.

Figure 2:
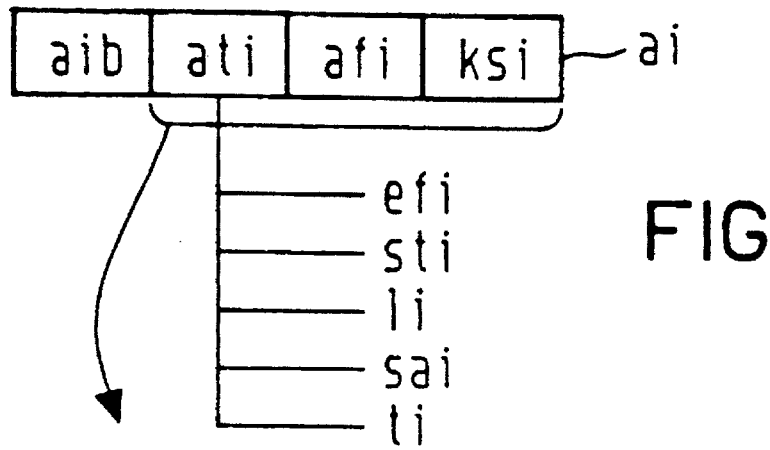
FIG. 2 is a schematic illustration of an updating message.

The format of an updating message ai is shown in FIG. 2. An information element aib is inserted in the first region of this updating message ai, this information element aib defining this message as an updating message ai. This is followed by "type of order" information ati by which the type of order processing is defined. Five types of job information ati are indicated in Figure 2 for the exemplary embodiment, whereby respectively only one of these five type of job information ati can be inserted into an updating message ai. When data entry information efi is contained in the updating message ai, then the transferred administration order program module APM is stored in the job file memory AS and the information contained in the updating message ai is acquired by the job management routine AVR and is entered into the job library file ABR. When the type of job information is represented by start information sti, then, given the presence of data entry information, the administration order program module APM is acquired and the processing of the administration order program module APM at the next possible point in time is additionally effected. When the type of job information ati represents erase information li, then the job, i.e. not the administration order program module APM, is erased. Further, the type of job information ati can be represented by status information sai, whereby the respective operating condition, i.e. the operating status of the respective administration order program module, can be called in by this status information sai. This means that the existing information about the processing status of the respective administration order program module APM is communicated from the network management central NMZ to the data processing system DVA. Finally, the type of job information ati, can be represented by time information ti, whereby the beginning of the processing of the allocated administration order program module APM is defined by the indicated time information ti.

The updating message ai further comprises job information afi and communication system information ksi. The job information afi indicates the job, i.e., the respective operator task (for example, establish subscriber, as set forth) allocated to the administration order program module APM. The communication system information ksi indicates the identifier of the communication system KS to which the administration order program module APM is communicated and processed, for example, an establish subscriber. A processing result or the processing status information is communicated to the network management central NMZ. In the exemplary embodiment, n communication system KS1... KSn have the numerals 1... n allocated to them as communication system information ksi.

Figure 3:
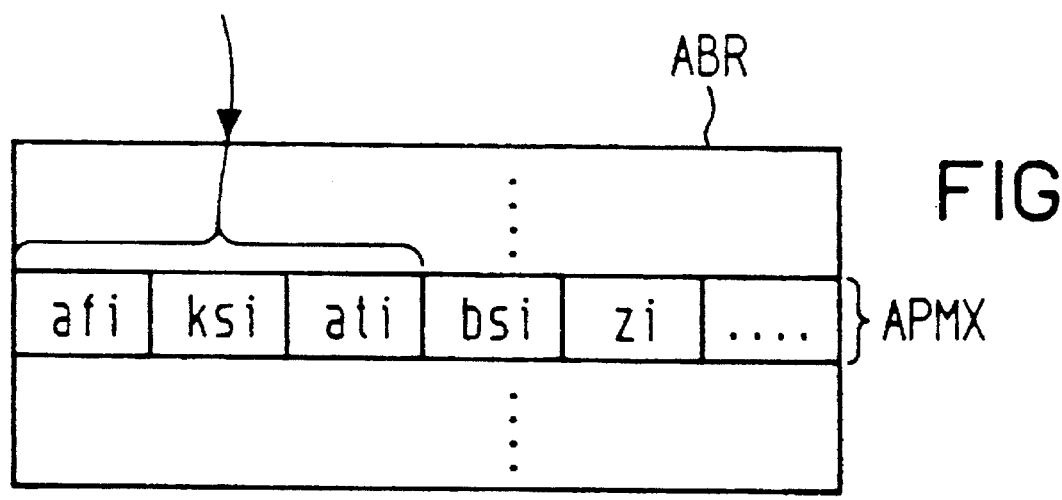
FIG. 3 is a schematic illustration of the job library file.

FIG. 3 shows the memory area of the job library file ABR. For example, an information row that is allocated to an administration order program module APMx is entered in the job library file ABR. The type of job information ati, the job information afi and the communication system information contained in the allocated updating message ai are entered into the first three areas by the job management routine AVR. Processing status information bsi is inserted in the fourth area. This processing status information bsi is formed by the job management routine AVR and is entered into this fourth area dependent on the current processing status. Subsequently, time information ti is also attached and indicates the point in time of specific processing statuses.

The following operating statuses can be called in using an updating message ai transferred from the data processing system DVA wherein a status information sai is contained: a data entry status efs which indicates that the administration order program module APM was entered but that no order for processing is present; a waiting status that indicates the waiting state of the respective administration order program module APM up to the next possible start of processing or up to a scheduled start of processing; a transmission status that indicates that the respective administration order program module APM was communicated to the communication system KS identified by the communication system information ksi; an execution status that indicates the end of processing of the respective administration order program module APM; an error status fes with which an error during the processing of the administration order program module APM is indicated; a result status ers that indicates the result of the processing of the administration order program module APM; an erase status that indicates that the job for the allocated administration order program module APM was erased; and a present status that indicates the presence of an administration order program module APM in the job file memory AS.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transferring and logging operator-task-oriented administration order program modules formed by administration and maintenance instructions from a data processing system via a local network to a network management central that can be connected to communications systems via a communication network, the network management central having a job management routine that coordinates the processing of the administration order program modules, comprising the steps of:

transferring the administration order program modules from the data processing system into a job file memory of the network management central;

entering job information, communication system information, and type of job information contained in an allocated updating message into a job library file of the network management central, the respective entry into the job library file being indicated to the job management routine by the respective updating message, said type of job information being status information;

dependent on the informational contents of the type of job information and the job and communication system information contained in the updating message, processing the stored administration order program modules using the job management routine; and entering processing status information into the job library file respectively associated to administration order program modules.

2. The method according to claim 1, wherein the method further comprises modifying the type of entered job processing by type of job information, job information and communication system information contained in a further transferred updating message by entering the currently transferred type of job information into the job library file or the entered processing states information is read and is transferred to the data processing system, the affected administration order program module being defined by the job and communication system information.

3. The method according to claim 1, wherein the type of job information is represented by data entry information, with which the entry of an administration order program module and of the job and communication system information in the job library file is effected.

4. The method according to claim 1, wherein the type of job information is represented by start information, with which the entry of the currently communicated administration order program module into the job library file and of a next possible processing start of the administration order program module is effected.

5. The method according to claim 1, wherein the type of job information is represented by erase information, with which erasing of a processing job for the allocated administration order program module is effected.

6. A method for transferring and logging operator-task-oriented administration order program modules formed by administration and maintenance instructions from a data processing system via a local network to a network management central that can be connected to communications systems via a communication network, the network management central having a job management routine that coordinates the processing of the administration order program modules, comprising the steps of:

transferring the administration order program modules from the data processing system into a job file memory of the network management central;

entering job information, communication system information, and type of job information contained in an allocated updating message into a job library file of the network management central, the respective entry into the job library file being indicated to the job management routine by the respective updating message;

dependent on the informational contents of the type of job information and the job and communication system information contained in the updating message, processing the stored administration order program modules using the job management routine;

entering processing status information into the job library file respectively associated to administration order program modules; and the type of job information being represented by status information, with which an interrogation of the processing status information of the allocated administration order program module is effected, the status information being at least one of, a data entry status indicating entry of the administration order program module, a waiting status indicating a waiting state of the respective administration order program module, a transmission status indicating transmission of the respective administration order program module to one of the communication systems, an execution status indicating an end of processing of the respective administration order program module, an error status indicating an error during processing of the administration order program module, a result status indicating a processing result of the respective administration order program module, an erase status indicating an erase state of the processing job of the respective administration order program module, and a present status indicating presence of a respective administration order program module.

7. The method according to claim 1, wherein the type of job information is represented by time information, with which a start is set of processing of the allocated administration order program module.

8. The method according to claim 1, wherein the job information is represented by operator-task-related information.

9. The method according to claim 1, wherein the communication system in the communication network to which the entered administration order program module is allocated is defined by the communication system information.

10. A method for transferring and logging operator-task-oriented administration order program modules formed by administration and maintenance instructions from a data processing system via a local network to a network management central that can be connected to communications systems via a communication network, the network management central having a job management routine that coordinates the processing of the administration order program modules, comprising the steps of:

transferring the administration order program modules from the data processing system into a job file memory of the network management central;

entering job information, communication system information, and type of job information contained in an allocated updating message into a job library file of the network management central, the respective entry into the job library file being indicated to the job management routine by the respective updating message, said type of job information being status information and said job information being operator-task-related information;

dependent on the informational contents of the type of job information and the job and communication system information contained in the updating message, processing the stored administration order program modules using the job management routine;

entering processing status information into the job library file respectively associated to administration order program modules; and modifying the type of entered job processing by type of job information, job information and communication system information contained in a further transferred updating message by entering the currently transferred type of job information into the job library file or reading and transferring the entered processing status information to the data processing system, the affected administration order program module being defined by the job and communication system information.

11. The method according to claim 10, wherein the type of job information is represented by data entry information, with which the entry of an administration order program module and of the job and communication system information in the job library file is effected.

12. The method according to claim 10, wherein the type of job information is represented by start information, with which the entry of the currently communicated administration order program module into the job library file and of a next possible processing start of the administration order program module is effected.

13. The method according to claim 10, wherein the type of job information is represented by erase information, with which erasing of a processing job for the allocated administration order program module is effected.

14. The method according to claim 10, wherein the type of job information is represented by status information, with which an interrogation of the processing status information of the allocated administration order program module is effected the status information being at least one of, a data entry status indicating entry of the administration order program module, a waiting status indicating a waiting state of the respective administration order program module, a transmission status indicating transmission of the respective administration order program module to one of the communication systems, an execution status indicating an end of processing of the respective administration order program module, an error status indicating an error during processing of the administration order program module, a result status indicating a processing result of the respective administration order program module, an erase status indicating an erase state of the processing job of the respective administration order program module, and a present status indicating presence of a respective administration order program module.

15. The method according to claim 10, wherein the type of job information is represented by time information, with which a start is set of processing of the allocated administration order program module.

16. The method according to claim 10, wherein the communication system in the communication network to which the entered administration order program module is allocated is defined by the communication system information.

17. A method for transferring and logging operator-task-oriented administration order program modules formed by administration and maintenance instructions from a data processing system via a local network to a network management central that can be connected to communications systems via a communication network, the network management central having a job management routine that coordinates the processing of the administration order program modules, comprising the steps of:

transferring the administration order program modules from the data processing system into a job file memory of the network management central;

entering job information, communication system information, and type of job information contained in an allocated updating message into a job library file of the network management central, the respective entry into the job library file being indicated to the job management routine by the respective updating message;

dependent on the informational contents of the type of job information and the job and communication system information contained in the updating message, processing the stored administration order program modules using the job management routine;

entering processing status information into the job library file respectively associated to administration order program modules; and the type of job information being status information, the job information being operator-task-related information, and the communication system in the communication network to which the entered administration order program module is allocated being defined by the communication system information.

18. The method according to claim 17, wherein the type of job information is one of:

data entry information, with which the entry of an administration order program module and of the job and communication system information in the job library file is effected;

start information, with which the entry of the currently communicated administration order program module into the job library file and of a next possible processing start of the administration order program module is effected;

erase information, with which erasing of a processing job for the allocated administration order program module is effected;

status information, with which an interrogation of the processing status information of the allocated administration order program module is effected, wherein the status information is at least one of a data entry status indicating entry of the administration order program module, a waiting status indicating a waiting state of the respective administration order program module, a transmission status indicating transmission of the respective administration order program module to one of the communication systems, an execution status indicating an end of processing of the respective administration order program module, an error status indicating an error during processing of the administration order program module, a result status indicating a processing result of the respective administration order program module, an erase status indicating an erase state of the processing job of the respective administration order program module, and a present status indicating presence of a respective administration order program module; and time information, with which a start is set of processing of the allocated administration order program module.

19. The method according to claim 17, wherein the method further comprises modifying the type of entered job processing by type of job information, job information and communication system information contained in a further transferred updating message by entering the currently transferred type of job information into the job library file or the entered processing status information is read and is transferred to the data processing system, the affected administration order program module being defined by the job and communication system information.

* * * * *